Aug. 27, 1968  L. H. MENZL  3,398,976
VEHICULAR TOWING BAR
Filed Sept. 26, 1966  2 Sheets-Sheet 1
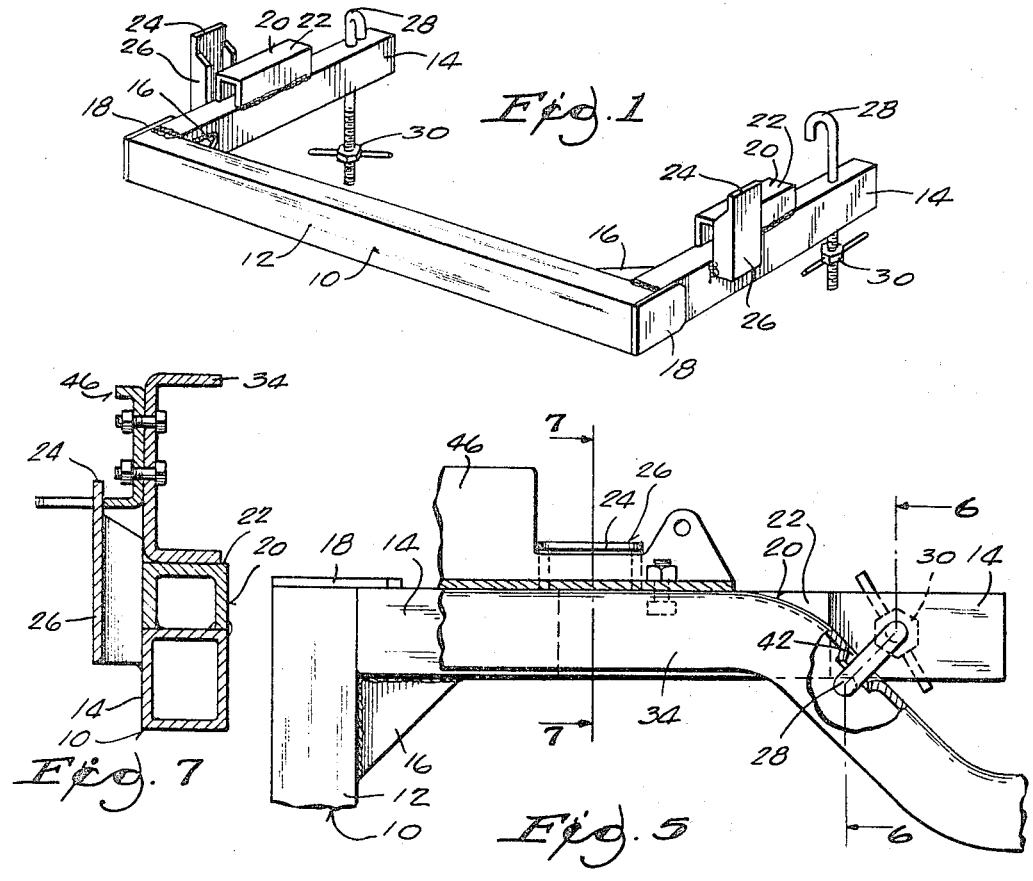
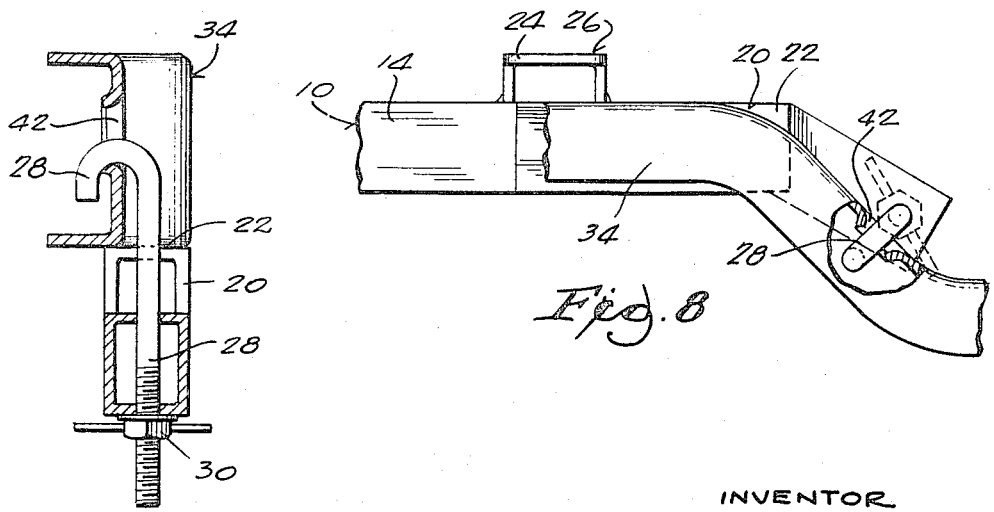
INVENTOR
LUDWIG H. MENZL
BY Lieber & Nilles
ATTORNEYS Aug. 27, 1968          L. H. MENZL          3,398,976
VEHICULAR TOWING BAR
Filed Sept. 26, 1966          2 Sheets-Sheet 2
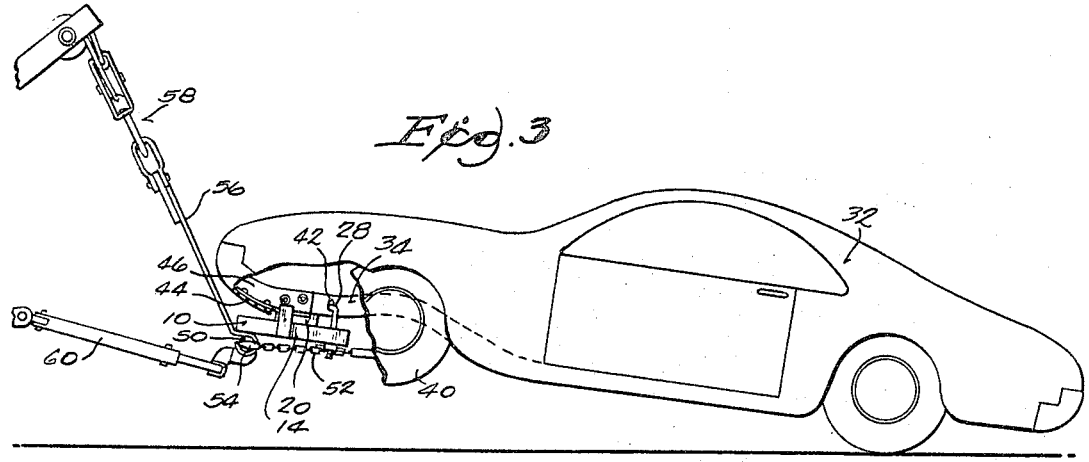
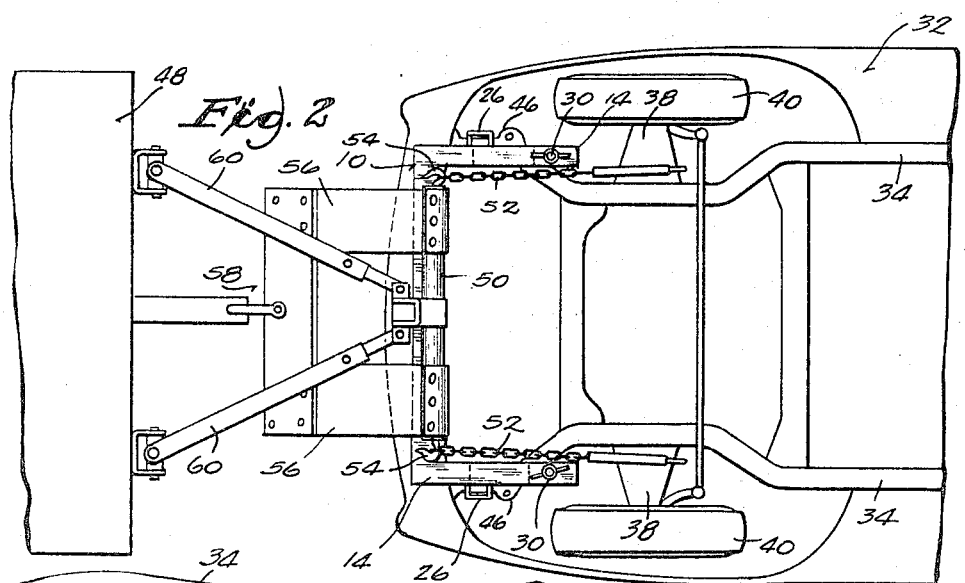
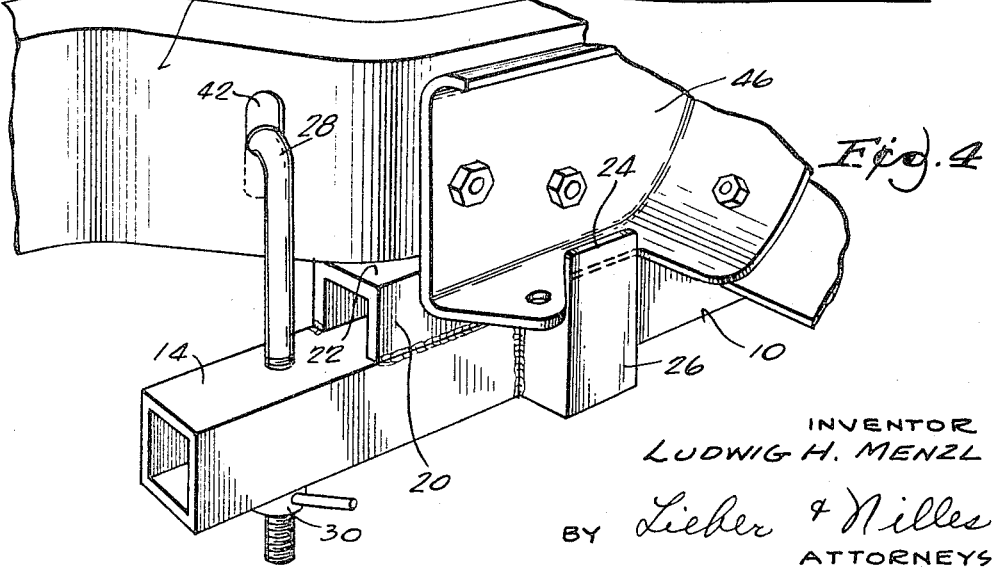
INVENTOR
LUDWIG H. MENZL
BY *Lieber & Nilles*
ATTORNEYS United States Patent Office 3,398,976
Patented Aug. 27, 1968

3,398,976
VEHICULAR TOWING BAR
Ludwig H. Menzl, W148 N7535 Woodland Drive,
Menomonee Falls, Wis. 53051
Filed Sept. 26, 1966, Ser. No. 582,071
8 Claims. (Cl. 280—495)

The present invention relates to a detachable vehicular towing bar for use in towing disabled or illegally parked vehicles by means of a tow truck.

Tow trucks employ a structure mounted on the rear of the truck to provide both lift and draw to the towed vehicle. The conventional structure employs a lifting member, such as an A-frame or boom, having a winch-operated cable connected through straps to a draw bar. The straps are constructed of rubber or rubber-covered material to protect the vehicle from damage as it is lifted. The drawing members include a drawing frame on the rear of the truck which is connected to the draw bar by means of a universal joint.

During the towing operation, the draw bar is lowered to a position beneath and behind the front or rear bumper of the vehicle. Chains are hooked to the stub axles or king pin supports, for front towing, or to the rear axle, for rear towing. The other end of the chains are hooked to the ends of the draw bar so as to position it below and behind the bumper.

The winch is then operated to raise the draw bar by means of the cable so that it abuts the longitudinal vehicle frame members supporting the bumper. Further raising of the draw bar raises the front or rear of the vehicle, such as an auto. When the draw bar has been raised a sufficient amount to lift the front or rear wheels off the ground, the winch is locked. The auto may then be towed by the force exerted by the tow truck through the draw frame, the draw bar, and the chains, on the axle or king pin supports. It will be appreciated, that in order to be positioned as described above a standard or general purpose draw bar must be sized to fit the smallest vehicle which is to be towed.

With recent styling changes, however, autos have become lower and wider. Additionally, large numbers of autos are being equipped with engine-driven accessories, such as air conditioners. In order to accommodate the low, wide radiators, and other engine components, and the engine driven accessories, it has become necessary to spread the longitudinal frame members of the auto apart.

Front wheel drive vehicles have recently been reintroduced to the market. These autos also must have their longitudinal frame members widely separated to permit the engine, transmission, and drive mechanism to be mounted in the front end.

Recent styling changes have also featured a smooth flowing look in which, for example, the lower edges of the front and rear bumpers have been sloped sharply inward toward the center of the auto to lend a streamlined look to it.

These styling changes have made the towing of such autos difficult because the distance between the frame members is greater than the length of the tow truck bar and/or because the bumper is shaped so as to shield or overhang the frame members. Thus it becomes difficult, if not impossible, to place the draw bar in abutment with the vehicle frame members, and hence, the towing of such vehicles has been rendered difficult or impossible. Frequently, when towing was attempted, damage to the bumpers resulted. As the position of the frame members in the rear of the auto and the shape of the rear bumper is generally the same as in the front of the auto, towing from the rear was likewise rendered impossible. Also, in front wheel drive vehicles, there are often no rear frame members, making it impossible to tow these autos from the rear.

It is, therefore, an object of the present invention to provide a vehicular tow bar which permits the towing of disabled or illegally parked vehicles having widely spaced longitudinal frame members.

It is another object of the present invention to provide a vehicular tow bar which permits towing of such vehicles without damage to the frame members or bumpers.

Yet another object of the present invention is to provide a vehicular tow bar which is quickly and easily attached and detached from the vehicle.

A further object of the present invention is to provide a detachable vehicular tow bar which is rigidly affixed to the auto so as to withstand the stresses of towing.

A still further object of the present invention is to provide a vehicular tow bar which is simple and economical in construction.

Other objects and advantages of the present invention will appear hereinafter in the specification, reference being had to the accompanying drawings in which:

FIGURE 1 is a perspective view of the vehicular tow bar of the present invention;

FIGURE 2 is a partial view of both a vehicle and a tow truck, viewed from beneath and looking up, showing the tow bar attached to the vehicle;

FIGURE 3 is a partial side view of a part of the tow truck and a vehicle in towing position, with a portion of the vehicle broken away to reveal the tow bar of the present invention;

FIGURE 4 is a perspective view of a portion of the tow bar of the present invention showing a means for attaching it to the frame members of the vehicle and a means for maintaining the tow bar in vertical alignment with the frame members;

FIGURE 5 is a partial top view of the tow bar showing a means for attaching it to the frame members of the vehicle and a means for maintaining it in vertical alignment with the frame members;

FIGURE 6 is a cross-sectional view taken along line 6—6 of FIGURE 5 showing in further detail, a means for attaching the tow bar to the frame members;

FIGURE 7 is a cross-sectional view taken along line 7—7 of FIGURE 5 showing in further detail a means for maintaining the tow bar in vertical alignment with the frame members; and FIGURE 8 is a partial top view of the tow bar of the present invention showing modification of the tow bar to permit attachment to frame members of differing shapes.

Turning now to FIGURE 1, a detachable vehicular tow bar of the present invention is shown therein indicated by the numeral 10. The bar includes a lateral beam 12 having a supporting member 14 extending from each end thereof. Supporting members 14 may be fastened to lateral beam 12 by welding the supporting members to the beam. This may be supplemented by gussets 16 and/or plates 18. To facilitate manufacture of vehicle tow bar 10, it is presently considered preferable to form lateral beam 12 and support members 14 from stock having a square or rectangular cross-section. However, other configurations may be used if desired. Further, while supporting members 14 are shown as extending perpendicularly from lateral beam 12 in FIGURE 1, they may extend at an acute or obtuse angle if desired, or if required by the use to which the tow bar is to be put.

Each of supporting members 14 has a pad block 20 mounted on the top thereof which has a flat upper surface 22. A vertical alignment flange may be formed of channel stock 26 fastened to the outside of support member 14 having the side wall cut away to permit the web to form flange 24.

The end of each of support members 14 contains a means for attaching tow bar 10 to the frame members of the auto, as hereinafter described. This means may, for example, comprise a pair of hooks 28 which are slidably journaled in holes in support members 14. The portions of hooks 28 extending below support members 14 are threaded and have wing nuts 38 mounted thereon to adjust the length of the portions of hook 28 extending above support members 14.

FIGURE 2 shows the underside of the front end of a vehicle, specifically auto 32. In accordance with standard automobile design, auto 32 contains a pair of longitudinal frame members 34 running the length of the auto. These frame members form the chassis of the auto upon which the body, engine, and other portions of the auto rest. Frame members 34 also mount king pin supports 38 for wheels 40. In order to permit wheels 40 to be cocked for steering, frame members 34 must be narrowed adjacent wheels 40. However, as previously noted, in order to accommodate the engine radiator, the engine, engine-driven accessories, and the drive train in a front wheel drive auto, the frame members are widened at their extreme ends. This causes the forward portions of the frame members to asume an hourglass shape. Frame members 34 have holes 42 in their vertical walls which are used to manipulate the frame during manufacturing and during transport of the assembled auto.

The bumper 44 is fastened to the front end of frame member 34 by means of brackets 46, as shown in detail in FIGURE 4. These brackets are bolted to the outside of frame members 34 and to the lower edge of bumper 44.

FIGURE 2 also shows tow bar 10 attached to auto 32. This is accomplished by first placing tow bar 10 on the ground directly below the forward portions of frame members 34. The ends of both support members 14 are then lifted so that hooks 28 may be inserted in holes 42. Lateral beam 12 is then lifted and wing nuts 30 tightened to shorten the portions of hooks 28 extending above support members 14 and clamp tow bar 10 to frame members 34 as shown in FIGURE 4, in perspective, and in FIGURE 6, in cross-section.

Tow bar 10 is positioned in vertical alignment with frame members 34 by alignment flanges 24 which mate with bumper brackets 46 on the outside of frame members 34, as shown in FIGURES 4 and 5. It will be appreciated that if it is not desired to use bumper brackets 46, or bumper brackets 46 are not present, flanges 24 may be positioned to mate directly with frame members 34.

Hooks 28 and flanges 24 thus affix and position tow bar 10 to frame members 34.

Support members 14 actually contact frame members 34 through pad blocks 20, see FIGURE 7, which position support members 14 below frame members 34 a sufficient distance to allow them to clear the lower edge of bumper 44. Pad blocks 20 may be omitted if not needed or desired.

When tow bar 10 is mounted on frame members 34, as described above, lateral beam 12 will be positioned below, but in approximately vertical alignment with bumper 44, as shown in FIGURE 3, permitting a standard, or general purpose draw bar 50 to be connected as follows.

Draw bar 50 is placed beneath lateral beam 12. Chains 52 are hooked over king pin supports 38, passed under tow bar 10, and placed in hooks 54 at the ends of draw bar 50. Draw bar 50 is then raised by straps 56 which are connected to the draw bar and to the lifting mechanism 58 of tow truck 48. Draw bar 50 lifts lateral beam 12 and tow bar 10 and raises the front end of auto 32, permitting it to be towed by the force exerted on chains 52 and draw bar 50 by drawing frame 60 mounted on the rear of tow truck 48. The lifting of lateral beam 12, tends to pivot the rear portion of tow bar 10 downward to secure hooks 28 more firmly in holes 42.

Tow bar 10 may be mounted on the rear ends of longitudinal frame members 34 in the same manner as described above. If it is desired to tow auto 32 from the rear. Also as shown in FIGURE 8, the ends of supporting members 14 may be bent, or otherwise altered, so as to permit tow bar 10 to be adapted for use on autos having frame members of differing shapes. Supporting members 14 may contain a plurality of holes in which hooks 28 may be journaled, so as to permit them to be inserted in holes placed at differing positions along frame members 34. If no holes are available in frame members 34, hooks 28 may be fashioned to fit over frame members 34 themselves.

Other modifications may be made to the tow bar, as described above, and it is intended to cover in the appended claims, all such modifications and variations as fall within the true spirit and scope of the invention.

I claim:

1. A detachable tow bar for towing vehicles having a wide span between longitudinal side frame members and overhanging bumpers by means of a standard draw bar comprising:
    a beam extending laterally of said side frame members and below said bumper when the tow bar is in the mounted position, for operative association with said draw bar;
    a pair of supporting members having end portions extending rearwardly from said lateral beam, said members being adapted to abut said side frame members; and
    means mounted on said end portions for attaching said supporting members to said side frame members, said means comprising hooks mounted in said support members and cooperating with said side frame members to place the tow bar in the mounted position.

2. The detachable tow bar of claim 1 wherein said side frame members have holes therein and said hooks are insertable in said holes to retain said supporting members thereon.

3. The detachable tow bar of claim 1 wherein said supporting members abut the lower surfaces of said side frame members and contain means for maintaining said supporting members in vertical alignment with said frame members.

4. The detachable tow bar of claim 1 wherein said supporting members contain pad blocks abutting said side frame members and positioning said supporting members below said frame members.

5. The detachable tow bar of claim 1 wherein said supporting members are shaped to conform to the contours of said side frame members.

6. The detachable tow bar of claim 1 wherein said hooks extend slideably through said end positions of said support members with the upper portion of said hooks cooperable with said side frame members and the lower portion of said hooks containing means to adjust the length of the upper portion of said hooks.

7. The detachable tow bar of claim 1 wherein said lateral beam and said supporting members are square in cross section.

8. The detachable tow bar of claim 3 wherein said side frame members contain brackets mounting said bumper and said means for maintaining said supporting members in vertical alignment with said side frame members comprise flanges mounted on the outside of said support members and engaging said brackets.

References Cited

UNITED STATES PATENTS

| | | | |
|---|---|---|---|
| 1,851,349 | 3/1932 | Cowles | 280—402 XR |
| 2,111,341 | 3/1938 | Tetrault | 214—86 |
| 2,183,478 | 12/1939 | Holmes et al. | 214—86 |
| 2,555,663 | 6/1951 | Schouboe. | |

FOREIGN PATENTS 687,492  2/1953  Great Britain.

ALBERT J. MAKAY, *Primary Examiner.*